Jan. 19, 1937.    W. B. CLIFFORD    2,068,626
THERMOSTATIC UNIT
Original Filed Dec. 14, 1931
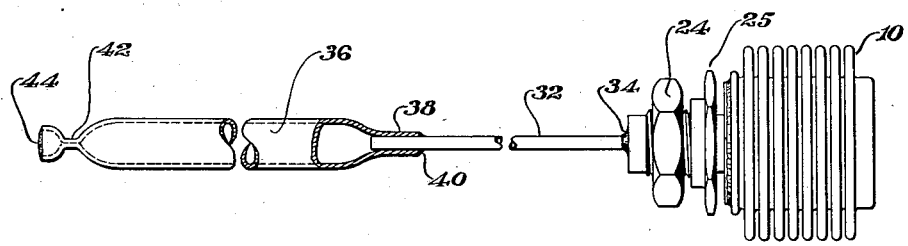
Fig. 1
Fig. 2
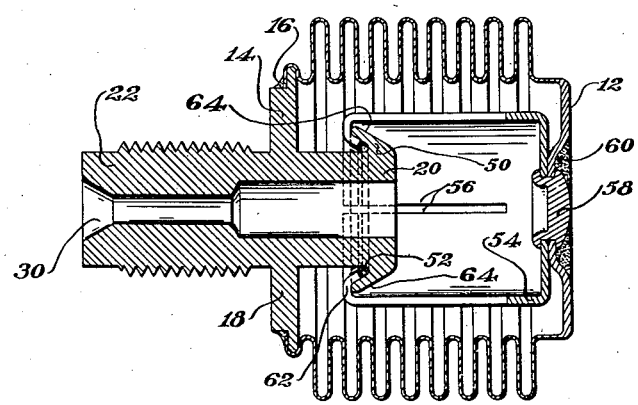
Witness
Paul F. Bryant
Inventor
Walton B. Clifford
by his attorneys Patented Jan. 19, 1937

2,068,626

UNITED STATES PATENT OFFICE 2,068,626

THERMOSTATIC UNIT

Walter B. Clifford, Boston, Mass., assignor to Clifford Manufacturing Co., Boston, Mass., a corporation of Delaware Application December 14, 1931, Serial No. 580,750
Renewed June 23, 1936

6 Claims. (Cl. 297—8)

The present invention relates to thermostatic units, and more particularly to such units embodying a flexible metallic diaphragm such as a bellows.

This type of unit, either directly or remotely controlled, is employed in substantial volume for the operation of electric switches, gas and steam valves and the like, to control the operation of the motor or the flow of gas or steam in accordance with variations in temperature. Among other uses is the automatic maintenance of refrigerating temperatures by intermittently operating the refrigerator in a cycle through a thermostatic unit controlled from the temperature of a refrigerating box and operating an electric switch or the like which controls the starting and stopping of an electrically propelled compressor pump.

It is important that the thermostatic unit for this class of work shall be active at the relatively low temperatures employed, on the order of 25° to 45° F. or lower. For this purpose the thermostatic unit may be loaded with a thermostatic fluid such as sulphur dioxide or methyl chloride, both of which have relatively pronounced vapor pressure curves at these temperatures. It is also desirable from the point of view of satisfactory operation that the metallic bellows itself shall be flexible and readily responsive to slight variations in the vapor pressure therewithin, thus making the unit sensitive to correspondingly slight variations in the temperature of the refrigerating box and accordingly capable of close regulation.

In addition to sensitivity throughout a low temperature range, the unit must be capable of withstanding room temperatures or higher without developing excessive pressure therewithin sufficient to distort the relatively fragile metallic envelope, and have provision during periods when subjected to room temperatures or above for limiting expansive movement under the influence of the vapor pressure to avoid injury to the bellows due to improper or undue expansion.

I have discovered that I can effectively produce a thermostatically operated bellows unit having extreme sensitivity at a low temperature range and freedom from liability of injury at higher temperatures by providing a sealed unit within which is located a limited charge of sulphur dioxide fluid, and providing in addition means for limiting the expansive movement of the bellows under extreme vapor pressures caused by temperatures relatively higher than those encountered in the working range. By employing a limited fill properly designed in amount, I am able to provide throughout the working range, which may be temperatures below 50° F. or thereabouts, a pressure within the bellows which corresponds substantially to the true vapor pressure of the fluid within the bellows, and above these temperatures a pressure which increases only slightly and which is based upon gaseous expansion rather than the vapor pressure of a liquid due to the complete conversion of the limited amount of liquid into a gas. By proper coordination of this fill I am enabled to use a metallic bellows with an extremely thin wall incapable of withstanding substantial internal pressures, but extremely sensitive and responsive to variations in pressure. By employing with this sensitive bellows a fill such as sulphur dioxide, which has an actively rising vapor curve throughout the desired temperature range, I provide necessary activity at this range without encountering pressures at higher temperatures which would tend to permanently distort and injure the bellows unit. Even with such an arrangement, however, I find it necessary to provide means for limiting the elongation or expansion of the bellows which would otherwise take place under the influence of the vapor pressure, and to this end I provide within the bellows unit limiting members which are normally inactive within the working range of the bellows, but which serve to limit expansive movement of the bellows to a range which the bellows is amply capable of withstanding.

With these and other objects in view still further features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents an elevation of a sealed thermostatic unit capable of use as a remote control; and Fig. 2 is a section of the bellows portion of the unit shown in Fig. 1, illustrating the interior limiting stops.

The thermostatic unit shown in the illustrated embodiment of the invention comprises generally a metallic bellows 10 formed from a cupped drawn tube having an integrally closed end portion 12. The open end of the bellows is closed and hermetically sealed by an end fitting 14 bonded to the tube at 16. The fitting comprises generally an enlarged annular portion 18 formed integrally with a reduced and inwardly extending neck portion 20, and an outwardly extending threaded portion 22 adapted for attachment of the unit into a switch unit or a gas valve or the like, this attachment being complemented by attaching nuts 24 and 25.

Sealed within the outwardly flared passage 30 formed in the portion 22 is a length of tubing 32, bonded to the fitting at 34. As shown more particularly in Fig. 1, this tubing may be connected at its opposite end to an enlarged bulb 36, having a reduced neck portion 38 within which the end of the tube is sealed and bonded at 40. The opposite reduced end of the bulb is completely pinched off at 42 and hermetically closed and sealed by a solder button 44. The interior of this complete thermostatic unit contains sulphur dioxide or an equivalent thermostatic fluid sealed therein under a vacuum, the charge of this fluid being so proportioned that all of the liquid within the system is completely converted to a gaseous condition at temperatures above the working range, or on the order of 50° F. or thereabouts. By virtue of this construction the pressure within the system, which increases in accordance with the vapor pressure curves of the sulphur dioxide throughout the refrigerating range, flattens off and thereafter increases only to a degree based upon gaseous expansion rather than vapor pressure. This avoids the creation of excessive pressures within the bellows unit at temperatures on the order of 80° or 90° F.

In filling the unit care is taken to completely exhaust air and remove all vestiges of both air and moisture in order that the operation of the unit shall truly reflect the vapor pressure curve of the confined fluid, and that the interior of the unit shall be free from air, water or the presence of any foreign material which might otherwise combine with the sulphur dioxide and progressively alter or affect the resilient pressure curve.

In conjunction with this limitation of internal pressure it is essential that the outward or expansive movement of the bellows unit shall be limited to a range of movement which will not induce a permanent set or distortion within the bellows themselves, this regardless of whether the pressure causing this movement is sufficient to injuriously distort the bellows or not. Unless care is taken that the extremely flexible and relatively fragile bellows wall shall not be distorted either through unusual pressure or undue expansion, a permanent set or distortion which influences the operating characteristics of the instrument is otherwise introduced which may be fully as detrimental in its consequences as a progressive change in the vapor pressure curve itself. It follows, therefore, that the protection of the sensitive bellows unit against distortion through unusual or sporadic pressures as well as the maintenance of a stable and predictable pressure curve within the unit is all important from the standpoint of a sensitive thermostatic unit which may be duplicated in any volume in commercial manufacture with the knowledge that each unit will operate and continue to operate in the same fashion as all other units.

In the illustrated embodiment of the invention a simple form of limiting stop for confining expansive movements of the bellows is produced by the use of inter-engaging resilient members extending from opposite ends of the bellows unit interiorly thereof, and designed through relative lateral movement to be engaged after completion of the unit. For this purpose the inwardly extending neck 20 is provided at its inner end with an enlarged portion 50 having a circumferential groove 52 formed therein providing a circumferential shoulder for engagement of a complementary portion to be described. At the opposite end of the bellows unit a cup 54 having resilient arms 56 is secured to the end of a flanged connector button or the like 58, the assembly being sealed within the head by solder 60. The outer free ends of the resilient arms 56 are provided with inturned hooks 62, which engage within the circumferential groove 52, as will be evident to those skilled in the art. With this construction, after the parts have been completed, compression of the bellows unit serves to cause the free ends of the resilient arms 56 to spread outwardly through engagement with the inclined face 64 formed on the head 50 until the hook ends have passed beyond the end of the head. Thereafter the resilience of the arms moves the hook ends inwardly in a lateral direction to the substantial position shown in Fig. 2. In this condition the bellows is free to contract from the position shown in Fig. 2 to the position determined by engagement of the hooked ends with the inner portion 18, and to expand outwardly to approximately the position shown in Fig. 2. Between these limits the complementary stop members do not inhibit or in any way affect the sensitivity or movement of the bellows. It will be observed that in operative relation the complementary stop members, as shown in Fig. 2, do not normally engage during expansive and contractive movements of the bellows between limits, the outer diameter of the circumferential shoulder formed by the enlarged portion 50 being substantially less than the inner diameter of the cup in the adjacent region. With this construction any slight tendency of the bellows to twist or swivel angularly about a longitudinal axis is not constrained or inhibited as would otherwise be the case if the interengaging members served not only the function of a stop, but a continuous guide. In usual practice the switch or valve within which the bellows unit is assembled is caused to operate from open to closed position, or vice versa, within the indicated limits of movement. When disconnected from the switch or valve, or before connection therewith or in the event that the switch or valve in and of itself does not limit the expansive movements, the provision of these limiting members serves to prevent expansion of the bellows unit to a point where permanent distortion will take place, regardless of the pressure generated therein. However, as stated previously, this pressure should be limited in such a fashion that even with sporadically higher temperatures which may be encountered, it is insufficient to cause any permanent and undesirable distortion of the bellows folds which would otherwise affect the operating characteristics of the unit.

It has been found with this type of construction that whereas the ordinary bellows unit having a wall thickness on the order of 8/1000ths of an inch or thereabouts, or in fact a unit having a double thickness of metal, each layer having a thickness of 6/1000ths or more, is normally necessary to withstand unusual pressures which may be involved, with my construction a bellows having a wall thickness on the order of 5/1000ths of an inch or even less may be employed, giving unusual sensitivity and permitting the employment of relatively smaller diameter bellows units than have heretofore been employed for this purpose. I find that with my construction bellows units having an outside diameter of 1⅛ inches or 1¼ inches may be effectively employed, whereas previously such units in order to combine the requisites of strength and flexibility required an outside diameter on the order of 2 inches or more.

What is claimed is:—

1. A thermostatic unit comprising a metallic bellows having thermostatic fluid sealed therein, a two-part expansive stop with the two parts connected respectively to opposite ends of the unit and having a lateral resilient portion in order that the parts may be initially assembled within the unit in disconnected relation, and thereafter connected in operative relation by contraction of the bellows below predetermined limits.

2. A thermostatic unit comprising a metallic bellows having thermostatic fluid sealed therein, and an expansion stop assembled completely interiorly of the bellows and comprising hooked members having capacity for lateral movement to permit initial engagement and to thereafter limit expansive movement of the bellows.

3. A thermostatic unit comprising a metallic bellows having thermostatic fluid sealed therein, interengaging stop members connected to opposite ends of the bellows unit interiorly thereof and extending toward one another, one of the members having resilient spring fingers with laterally extending end portions designed for cooperation with a complementary shoulder formed upon the oppositely disposed member to permit initial engagement through the yielding of the spring fingers, and to thereafter limit outward movement of separation of the two members.

4. A thermostatic unit comprising a metallic bellows having thermosatic fluid sealed therein, complementary stop members extending toward one another from opposite ends of the unit, one of the members provided with a tapered or inclined face portion terminating in a shoulder, and the complementary member being provided with one or more laterally yielding fingers adapted to initially move outwardly over the tapered face and having inturned end portions which engage behind the shoulder to thereafter limit expansive movement.

5. A thermostatic unit comprising a metallic bellows having a closed end portion, a head mounted in the opposite end of the bellows and having a reduced neck projecting into the bellows therefrom provided with a limiting shoulder at its inner end, and a complementary member having one or more yielding fingers connected to the opposite closed end of the bellows, the fingers being provided with inturned end portions to engage behind the shoulder when the bellows is contracted to interconnect the two parts for the purpose of limiting expansive movement of the bellows.

6. A thermostatic unit comprising a bellows wall permanently closed at opposite ends to provide an expansible and contractible cell, a member having resilient arms permanently connected to one end wall, the arms having inturned free ends, and a shouldered member permanently connected to the opposite end, the shoulder adapted to be engaged by the inturned free ends of the arms upon initial contracting movement, and designed to thereafter limit movement of separation while permitting angular movements of the bellows wall between limits of expansion.

WALTER B. CLIFFORD.